(12) United States Patent
Chidambarrao et al.

(10) Patent No.: US 7,761,278 B2
(45) Date of Patent: Jul. 20, 2010

(54) SEMICONDUCTOR DEVICE STRESS MODELING METHODOLOGY

(75) Inventors: Dureseti Chidambarrao, Weston, CT (US); Richard Q. Williams, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 11/673,824

(22) Filed: Feb. 12, 2007

(65) Prior Publication Data

US 2008/0195983 A1    Aug. 14, 2008

(51) Int. Cl.
*G06F 17/50* (2006.01)
(52) U.S. Cl. ...................................................... 703/14
(58) Field of Classification Search .................. 703/14; 716/2, 4, 10; 438/14; 257/200; 700/97, 700/109; 73/159, 760
See application file for complete search history.

(56) References Cited

U.S. PATENT DOCUMENTS

| | | | | |
|---|---|---|---|---|
| 5,546,312 | A * | 8/1996 | Mozumder et al. | 700/97 |
| 5,751,582 | A * | 5/1998 | Saxena et al. | 700/109 |
| 2002/0066310 | A1 * | 6/2002 | Jachim | 73/159 |
| 2003/0154451 | A1 | 8/2003 | Rassaian | |
| 2003/0173588 | A1 * | 9/2003 | Bianchi | 257/200 |
| 2004/0214355 | A1 * | 10/2004 | Miura et al. | 438/14 |
| 2005/0124079 | A1 * | 6/2005 | Steinmann et al. | 438/14 |
| 2006/0107243 | A1 * | 5/2006 | Chlipala et al. | 716/4 |
| 2006/0259881 | A1 * | 11/2006 | Sahara et al. | 716/4 |
| 2007/0028195 | A1 * | 2/2007 | Chidambarrao et al. | 716/2 |
| 2007/0180919 | A1 * | 8/2007 | Rosakis et al. | 73/760 |
| 2007/0204250 | A1 * | 8/2007 | Moroz et al. | 716/10 |
| 2008/0127005 | A1 * | 5/2008 | Lin et al. | 716/4 |

OTHER PUBLICATIONS

U.S. Appl. No. 11/193,711, to Dureseti Chidambarrao et al., entitled "Methodology for Layout Based Modulation and Optimization of Nitride Liner Stress Effect in Compact Models", filed Jul. 29, 2005.

* cited by examiner

*Primary Examiner*—Paul L Rodriguez
*Assistant Examiner*—Kandasamy Thangavelu
(74) *Attorney, Agent, or Firm*—Scully, Scott, Murphy & Presser, P.C.; H. Daniel Schnurmann

(57) ABSTRACT

A computational methodology that improves the accuracy of model parameters in a compact model uses methods and algorithms to self-consistently match independently developed base and stress models by re-fitting the stress model to the data set that generates the base model. The re-fitting algorithm removes any discrepancy between the base model and the stress model as the stress model is applied to the data set obtained from a dimension-scaling macro. Stress offsets for dimension-scaling macro devices are calculated to fit the measured values of the model parameters for the same devices. The process of fitting the model parameters to the data set from the dimension-scaling macro calculates constant, linear, and quadratic coefficients for the model parameters, which are employed to increase the accuracy of the model parameters and of the compact model used in circuit simulations and optimization.

28 Claims, 6 Drawing Sheets

SEMICONDUCTOR DEVICE STRESS MODELING METHODOLOGY

FIELD OF THE INVENTION

The present invention relates to a methodology for determining stress-dependent semiconductor device model parameters for semiconductor devices and, more particularly, to a methodology for determining device model parameters that are affected by layout-dependent stress, including metal-oxide-transistor field effect transistors (MOSFETs) carrier mobility and threshold voltage, and to a system for modeling the stress-dependent device characteristics of semiconductor devices, and to a system for simulating semiconductor circuits affected by stress, and to a system for optimizing design of semiconductor circuits that are affected by stress.

BACKGROUND OF THE INVENTION

Accurate modeling of semiconductor devices is needed to provide reliable circuit simulation results that can predict the behavior of a semiconductor circuit. Often, circuit simulations are used during a design phase of a circuit to predict circuit characteristics such as the drive current of an individual circuit component, the signal delay between multiple circuit components, or the overall performance of a circuit in terms of the operating speed of a chip and interaction with other chips.

Stress impacts the performance of semiconductor devices by altering the band structure of the semiconductor material, and consequently, the mobility of carriers. This effect is prominent in metal-oxide-semiconductor field effect transistor (MOSFET) devices since the transconductance of a MOSFET is impacted by the mobility of minority carriers in the body. For example, the hole mobility of a p-type MOSFET formed on a silicon substrate increases under a uniaxial compressive stress in the direction of the channel, i.e., along a line connecting the source and the drain. The electron mobility of an n-type MOSFET formed on a silicon substrate increases under a tensile stress in the direction of the channel. The change in the mobility of minority carriers depends on the type and direction of stress as well as the semiconductor substrate material.

Various methods of imparting stress on semiconductor devices have been known in the art, including strained layers formed in the semiconductor substrate, stress liners formed over a semiconductor device, and embedding a stress inducing material such as silicon germanium alloy within the semiconductor structure, e.g., within the source and drain regions of a MOSFET. Stress engineering has produced substantial improvement in the performance of semiconductor devices in general. However, the degree of improvement in the performance depends on the level of stress applied to the semiconductor device, e.g., on the level of stress applied to the channel of a MOSFET.

As a physical quantity, stress is defined at every point in a semiconductor device as a three-dimensional tensor, thus forming a tensor field within a semiconductor structure. Since the stress is generated by physical structures, variations in the arrangement in the physical structures around the semiconductor device results in variations in the stress. Thus, accurate modeling of semiconductor devices requires modeling of the effects of stress on semiconductor devices. Methods of modeling stress in semiconductor devices for device modeling and circuit simulation purposes are described in commonly-assigned, copending U.S. patent application Ser. No. 11/193,711, filed on Jul. 29, 2005, the contents of which are incorporated herein by reference.

Since stress is affected by many physical structures around a semiconductor device, stress modeling takes into account the variation of stress due to the physical structures around the semiconductor device structure in concern. Of utmost importance is the type and location of stress generating structures, such as stress-generating substrate layers, stress liners, and embedded stress-generating materials. The type and location of other physical structures that affect the transmission of stress also affects the stress applied to the semiconductor device.

Referring to FIG. 1, an exemplary semiconductor layout is provided in which a channel of a MOSFET is located in the area of the overlap of a gate 2 and an active area 6. The gate 2 is called a "victim gate" since the stress in concern is applied to the channel underneath the gate 2. Representations of physical structures that affect the stress on the channel of a physical MOSFET corresponding to the victim gate 2 include the victim gate 2 itself, another gate 3, contact bars 4 that represent metallic contact structures located directly on the active area 6, for example, source and drain regions of MOSFETs, the active area 6, shallow trench isolation (8, 8'), and the boundary 9 between one type of stress liner and another type of stress liner. In FIG. 1, the boundary 9 divides the shallow trench isolation into a first portion 8 with one type of stress liner and another portion 8' with another type of liner. While FIG. 1 illustrates representations of some exemplary structures, the stress applied to the channel underneath the victim gate, may be in general affected by many other types of physical structures that are represented in a layout by other objects, or instances that belong to other shape classes.

During modeling of stress, the physical structures are categorized into predefined stress-affecting shape classes with associated numbers that characterize the physical structure. During the design phase of a circuit, each of the physical structures is represented by an object, or an instance in a shape class. Examples of shape classes include the class of active areas defined in a design level called RX (recessed oxide), the class of gate conductors defined in a design level called PC (polysilicon conductor), the class of contact bars defined in a design level called MC (metal contact), the class of boundaries between one type of stress liner and another type of stress liner, which is defined in a level called BP (block p-type implantation), etc. Stud contacts are also contemplated as a shape class. Typically, many types of shape classes are defined in addition to those listed above to reflect the different stress characteristics of the corresponding physical structures. Instances of each of the shape classes typically include geometrical shapes in the design layout that defines a physical semiconductor structure. For example, an instance of the shape class of gate conductors is the gate conductor 3 in FIG. 1.

To calculate the stress on the channel beneath the victim gate 2, shape dimensions characterizing the geometrical aspects of an instance in a shape class are used in the calculation of stress contribution. This calculation is repeated for each instance in each shape class. Some exemplary shape dimensions shown in FIG. 1 include the width W of the active area 6 for an instance of active areas, the distance PC-PCW from the western edge (when the layout is viewed in the same manner as viewing a map) of the victim gate 2 to the wall of the first gate 3 located to the west, the dimensions (MCEW, MCEL, MCWW, MCWL, MC2WW, MC2WL) of the contact bars 4 around the victim gate 2, the distances (PC-MCE, PC-MCW, PC-MC2W) from the victim gate 2 to the contact bars 4, the distances (PC-RXE, PC-RXW) between edges of the victim gate 2 to the edges of the active area 6, the distances (PC-BPN, PC-BPS, PC-BPE, PC-BPW) to the closest northern, southern, eastern, and western edges of the boundary 9 between different types of stress liners, etc. Use of FIG. 1 herein is only for exemplary purposes. Typically, multiple instances, each of which belongs to any one of the multiple shape classes and characterized by different shape dimensions, contribute to the stress on the channel of a MOSFET.

As described above, the stress on the channel of a MOSFET is a three-dimensional tensor field defined within the volume of the MOSFET. In standard wafers with (001) surface direction and a (110) channel orientation, the primary components of stress that affect the devices are longitudinal and transverse stresses. Here the longitudinal stress is defined as the stress in the direction of current flow and the transverse stress is the stress normal to direction of current flow in the device width direction. The primary focus is on longitudinal and transverse stress components because the other stress components are expected to be less sensitive to layout changes. The stress effect of the stress tensor field within the MOSFET is three-dimensional and non-uniform, but it may be approximated analytically by a channel stress vector. These analytical solutions represent the average stress in the channel in the longitudinal and transverse directions.

Based on the relevant and critical sensitivities, the full three-dimensional stress tensor field within the MOSFET can be approximated and represented as a two component vector. In this two-dimensional vector approximation, channel stress is decomposed into average longitudinal and transverse stress components. These components are defined to reflect the average effect of stress on carriers as they traverse the channel. The longitudinal stress terms can be further decomposed into a self-stress term $\sigma_{self}$ and terms that reflect the influence of adjacent structures on the channel stress, such as a contact structure stress term $\sigma_{CA}$, a gate conductor structure stress term $\sigma_{PC}$, a shallow trench isolation stress longitudinal component term $\sigma_{RX}^L$, a liner boundary stress longitudinal component term $\sigma_{DSL}^L$, and an embedded material generated stress term $\sigma_{eSiGe}$. The transverse stress terms can be further decomposed into a body contact structure stress term $\sigma_{BC}$ (in the case of a semiconductor-on-insulator substrate), a shallow trench isolation stress transverse component term $\sigma_{RX}^T$, a liner boundary stress transverse component term $\sigma_{DSL}^T$.

$$\sigma^L = \sigma_{self} + \sigma_{CA} + \sigma_{PC} + \sigma_{RX}^L + \sigma_{DSL}^L + \sigma_{eSiGe} \quad (B.1)$$

$$\sigma^T = \sigma_{BC} + \sigma_{RX}^T + \sigma_{DSL}^T \quad (B.2)$$

The individual terms carry their own sign, i.e., may be positive or negative. The total longitudinal stress $\sigma^L$ includes the contribution from the left and right sides of the gate being analyzed in a design layout, left and right being oriented in the direction of the current flow, i.e., in the direction connecting the source and the drain in a physical MOSFET. The total transverse stress $\sigma^T$ includes the liner boundary stress transverse component term from the top and bottom of the gate being analyzed in the design layout, top and bottom being oriented in the plane of the semiconductor substrate surface and perpendicular to the direction of the current flow, as well as any shallow trench isolation transverse stress.

$$\sigma^L = \sigma_{left}^L + \sigma_{right}^L \quad (B.3)$$

$$\sigma^T = \sigma_{top}^T + \sigma_{bottom}^T \quad (B.4)$$

The channel stress thus computed may be utilized to improve the accuracy of a compact model in predicting compact model parameters. For example, the compact model parameters may be the carrier mobility in the channel of a MOSFET.

Referring to FIG. 2, a prior art method of computing model parameters in a compact model, as described in the above-mentioned U.S. Patent Application, is shown. The compact model comprises a base model and a stress model. Model parameters, such as carrier mobility in the channel of a MOSFET, are calculated by computing stress using the stress model and using it in the formula for the model parameter.

The base model is calibrated from a length scaling macro, i.e., a suite of transistors with varying gate length L (the distance between the source and the drain) and varying gate width W, while instances of other shape classes remain constant in the layout. This is the conventional way compact models are calibrated in the absence of stress effects. The stress model is calibrated with a layout-dependency macro, a suite of transistors with the same gate length L, while instances of other shape classes are varied.

Due to the large amount of time and resources required during the compact model build, the base model and the stress model are assembled independently. The assembled compact model must be self-consistent for channel length scaling, for example, in predicting the model parameters of the length scaling macros. However, channel length scaling may not be self-consistent because the base model inadvertently includes a component of channel length scaling introduced by the length dependent engineered stress, such as self stress. Since the stress model is theory-based and created independently of the base model, the prior art method is prone to overcompensating or undercompensating the stress effects for MOSFET devices with a different gate length than the one on which the stress model is built.

Concerning the accuracy of the prior art stress model, the carrier mobility in the channel is approximated by the composite mobility response to longitudinal and transverse stress, which is given by equation (B.5).

$$\mu(\sigma) = \mu(\sigma^L, \sigma^T) = \mu_0 \times (c_2^L \sigma^L \sigma^L + c_1^L \sigma^L + c_0^L + c_2^T \sigma^T \sigma^T + c_1^T \sigma^T + c_0^T) \quad (B.5)$$

The quantities $\sigma^L$, $\sigma^T$, and $\mu(\sigma^L, \sigma^T)$ are calculated by fitting measured data from physical semiconductor devices constructed using layout-dependency macros, i.e., a layout of multiple semiconductor devices designed to calculate $\sigma^L$, $\sigma^T$, and $\mu(\sigma^L, \sigma^T)$ from measured values of device parameters in each of the semiconductor devices. The term $\mu_0$ is calculated during the base model calibration. Since the fitting for $\sigma^L$ and $\sigma^T$ is performed with a data set from the layout-dependency macro, correction of self-stress for non-nominal device length is not provided according to the prior art. In other words, the calculated self-stress values are calibrated only for the device length that is used in the layout-dependency macro, which is typically the nominal device length.

Therefore, there exists a need for a methodology for providing an accurate stress model that is self-consistent with the data set generated from dimension-scaling macros in a compact model.

Also, there exists a need for a methodology for calculating model parameters with accurate constant, linear, and quadratic coefficients for a layout variable in a dimension-scaling macro to better predict the impact of stress on the model parameter.

Further, there exists a need for a system for modeling semiconductor devices employing an accurate stress model and accurate model parameters that are self-consistent with measurement data from dimension-scaling macros and has accurate constant, linear, and quadratic term coefficients for a layout variable in a dimension-scaling macro.

In addition, there exists a need for a system for simulating semiconductor circuit and/or optimizing semiconductor circuit that employs the accurate stress model and accurate model parameters that are self-consistent with measurement data from dimension-scaling macros and have accurate constant, linear, and quadratic term coefficients for a layout variable in a dimension-scaling macro.

SUMMARY OF THE INVENTION

The present invention provides a system and methods that address the needs described above by providing a computational methodology that improves the accuracy of model parameters in a compact model. In particular, the invention uses methods and algorithms to eliminate the discrepancy between a pair of independently developed base and stress models, by re-fitting the stress model to the data set that generates the base model, e.g., to a data set from a dimension-scaling macro. The re-fitting algorithm removes any discrepancy between the base model and the stress model as the stress model is applied to the data set obtained from the dimension-scaling macro. Stress offsets for dimension-scaling macro devices are calculated to fit the measured values of the model parameters for the same devices. A stress offset function provides the changes in the stress as a function of the device length. The process of fitting the model parameters to the data set from the dimension-scaling macro calculates constant, linear, and quadratic coefficients for the model parameters, which are employed to increase the accuracies of the model parameters and of the compact model used in circuit simulations and circuit optimization.

According to a first aspect of the present invention, a method for modeling a semiconductor device is provided, wherein stress is applied to the semiconductor device and the method comprises:

generating a dimension-scaling macro and deriving a base model by fitting a first data set from the dimension-scaling macro, wherein at least one intrinsic dimension of first model semiconductor devices is varied within the dimension-scaling macro, and the base model has a capability to calculate at least one model parameter;

generating a layout-dependency macro and deriving an original stress model by fitting a second data set from the layout-dependency macro, wherein instances of at least one shape class with various shape dimensions are present around second model semiconductor devices in the layout-dependency macro, and the original stress model has a capability to calculate the at least one model parameter;

re-fitting the original stress model to the first data set to calculate a dimension-dependent stress offset function; and incorporating the dimension-dependent stress offset function into a re-fitted stress model to provide a calculated value for the at least one model parameter.

Preferably, the method further comprises calculating a modified multiplier function, $m'(L,G)$, which has a mathematical form of $m'(L,G)=P(L,G)/Pf\{\sigma(L,0)\}$, wherein L is a set of at least one intrinsic dimension of the semiconductor device, G is a set of shape parameters, $P(L,G)$ is a dimension and geometry dependent formula for a model parameter, $\sigma(L,0)$ is a dimension dependent formula for stress on the first model semiconductor devices, and $Pf\{\sigma(L,0)\}$ is a stress dependent formula for the model parameter in the re-fitted stress model evaluated at $G=0$. The value of the modified multiplier function, $m'(L,G)$ is substantially 1.0 for all values of the at least one intrinsic dimension that is used in the re-fitting.

The re-fitted stress model may employ a longitudinal stress component and a transverse stress component, wherein the directions of both the longitudinal stress component and the transverse component are in the plane representing a surface of a semiconductor substrate and are orthogonal to each other.

Constant, linear, and quadratic coefficients of at least one intrinsic variable for the at least one model parameter may be calculated through the re-fitting of the first dataset.

The method may further comprise:

extracting layout-dependent features of the semiconductor device from a layout data set; and generating shape dimensions characterizing instances of at least one shape class from the layout-dependent features.

The semiconductor device, the first model semiconductor devices, and the second model semiconductor devices may be a metal-oxide-semiconductor field effect transistor (MOSFET), first model MOSFETS, and second model MOSFETs, respectively. The re-fitted stress model may employ a first scalar, which is a longitudinal channel stress, and a second scalar, which is a transverse channel stress, wherein the effect of a three-dimensional stress field within the MOSFET is approximated by the first and second scalars. The at least one model parameter may comprise at least one physical quantity selected from the group consisting of a carrier mobility of the MOSFET, a threshold voltage of the MOSFET, a stress in a channel of the MOSFET, a strain in a channel of the MOSFET, on current of the MOSFET, off current of the MOSFET, and an effective current of the MOSFET.

The at least one intrinsic dimension of the first model MOSFETs may comprise, in the mathematical sense, a length and a width of the first model semiconductor devices. The re-fitting of the first data set may be performed on the first model MOSFETs amongst which the lengths are varied.

According to a second aspect of the present invention, a system for modeling a semiconductor device is provided. The semiconductor device has at least one stress-generating component or at least one stress-transmitting component. The system comprises:

a first fitting means for fitting a first data set from a dimension-scaling macro to a base model, wherein at least one intrinsic dimension of first model semiconductor devices is varied within the dimension-scaling macro and the base model has a capability to calculate at least one model parameter;

a second fitting means for fitting a second data set from said layout-dependency macro to an original stress model, wherein instances of at least one shape class with various shape dimensions are present around the second model semiconductor devices in the layout-dependency macro and the original stress model has a capability to calculate the at least one model parameter; and a third fitting means for re-fitting the at least one model parameter to the first data set to generate a re-fitted stress model.

The system may further comprise a calculating means for calculating at least one stress offset during the re-fitting of the at least one model parameter to the first data set.

The re-fitted stress model may employ a first scalar, which is a longitudinal channel stress, and a second scalar, which is a transverse channel stress, wherein the effect of a three-dimensional stress field within the MOSFET is approximated by the first and second scalars. Constant, linear, and quadratic coefficients of at least one intrinsic variable for the at least one model parameter may be calculated through the re-fitting of the first dataset.

For example, the semiconductor device, the first model semiconductor devices, and the second model semiconductor devices may be a metal-oxide-semiconductor field effect transistor (MOSFET), first model MOSFETS, and second model MOSFETs, respectively. The at least one model parameter may comprise at least one physical quantity selected from the group consisting of a carrier mobility of the MOSFET, a threshold voltage of the MOSFET, a stress in a channel of the MOSFET, a strain in a channel of the MOSFET, on current of the MOSFET, off current of the MOSFET, and an effective current of the MOSFET.

According to a third aspect of present invention, a system for simulating semiconductor circuit operation comprises:

extraction means for extracting layout-dependent information of a semiconductor circuit from a layout data set; and a compact model which receives the layout-dependent information and generates at least one stress-dependent model parameter value for a semiconductor device in the semiconductor circuit for use in modeling the performance of the semiconductor circuit, wherein the at least one stress-dependent model parameter value is generated from a re-fitted stress model which is generated by re-fitting an original stress model to a first data set from a dimension-scaling macro, the re-fitted stress model is dependent on a dimension-dependent stress offset function, and the dimension-dependent stress offset function is generated by fitting stress to measured values of model parameters from a first data set from a dimension-scaling macro.

The system may further comprise calculating means for a modified multiplier function, m'(L,G), which has a mathematical form of m'(L,G)=P(L,G)/Pf{σ(L,0)}, wherein L is a set of at least one intrinsic dimension of the semiconductor device, G is a set of shape parameters, P(L,G) is a dimension and geometry dependent formula for a model parameter, σ(L, 0) is a dimension-dependent formula for stress on the first model semiconductor devices, and Pf{σ(L,0)} is a stress-dependent formula for the model parameter in a re-fitted stress model.

The semiconductor device may be a MOSFET and the re-fitted stress model may employ a first scalar, which is a longitudinal channel stress, and a second scalar, which is a transverse channel stress, wherein the effect of a three-dimensional stress field within the MOSFET is approximated by the first and second scalars.

The semiconductor device may be a MOSFET and the at least one stress-dependent model parameter may comprise at least one physical quantity selected from the group consisting of a carrier mobility of the MOSFET, a threshold voltage of the MOSFET, a stress in a channel of the MOSFET, a strain in a channel of the MOSFET, on current of the MOSFET, off current of the MOSFET, and an effective current of the MOSFET.

The re-fitted stress model may employ a longitudinal stress component and a transverse stress component, wherein the directions of both the longitudinal stress component and the transverse component are in the plane representing a surface of a semiconductor substrate and are orthogonal to each other.

The re-fitted stress model may provide constant, linear, and quadratic coefficients of at least one intrinsic variable for the at least one model parameter through the re-fitting of the first dataset.

According to a fourth aspect of the present invention, a system for optimizing design of semiconductor circuit is provided. The system comprises:

extraction means for extracting layout-dependent information of a semiconductor circuit from a layout data set;

a compact model which receives the layout-dependent information and simulates the semiconductor circuit, wherein a re-fitted stress model generates at least one stress-dependent model parameter value, the re-fitted stress model being generated by fitting an original stress model to a first data set from a dimension-scaling macro and being dependent on a dimension-dependent stress offset function, and the dimension-dependent stress offset function being generated by re-fitting stress to measured values of model parameters from a first data set from a dimension-scaling macro; and a circuit performance evaluation means for determining if a performance goal for the semiconductor circuit is met and, if a performance goal is not met, generating a diagnosis of causes of not meeting the performance goal.

The layout data set may be modified for further simulation if the performance goal is not met, and another round of simulation is performed until either the performance goal for the semiconductor circuit is achieved or results of simulation satisfies a preset condition for stopping a simulation.

The re-fitted stress model may employ a longitudinal stress component and a transverse stress component and the re-fitted stress model may provide constant, linear, and quadratic coefficients of at least one intrinsic variable for the at least one model parameter may be calculated through the re-fitting of the first dataset.

The semiconductor circuit may comprise a MOSFET and the at least one stress-dependent model parameter value may represent at least one physical quantity selected from the group consisting of a carrier mobility of the MOSFET, a threshold voltage of the MOSFET, a stress in a channel of the MOSFET, a strain in a channel of the MOSFET, on current of the MOSFET, off current of the MOSFET, and an effective current of the MOSFET.

The semiconductor circuit may comprise a MOSFET and the re-fitted stress model may employ a first scalar, which is a longitudinal channel stress, and a second scalar, which is a transverse channel stress, wherein the effect of a three-dimensional stress field within the MOSFET is approximated by the first and second scalars. The re-fitted stress model may provide constant, linear, and quadratic coefficients of at least one intrinsic variable for the at least one model parameter through the re-fitting of the first dataset

DETAILED DESCRIPTION OF THE INVENTION

As stated above, the present invention relates to a methodology for determining device model parameters that are affected by layout-dependent stress, including metal-oxide-transistor field effect transistor (MOSFET) carrier mobility and threshold voltage, to a system for modeling the stress-dependent device characteristics of semiconductor devices, to a system for simulating semiconductor circuits affected by stress, and to a system for optimizing semiconductor circuits that are affected by stress, which are now described in detail with accompanying figures.

The stress-dependent model parameter P may be any model parameter in a compact model that is altered by applied stress and characterizes device characteristics. The stress-dependent model parameter P is calculated from the layout-dependent information of a semiconductor device, or from the semiconductor circuit data typically in the format of a netlist, which may be extracted from a layout data set through an extraction means. The stress-dependent model parameter P may be any electrical parameter that affects the performance of a semiconductor device or a semiconductor circuit and is affected by the applied stress. In a metal-oxide-semiconductor field effect transistor (MOSFET), the stress dependent model parameter P may be a carrier mobility of a MOSFET, a threshold voltage of the MOSFET, a stress in a channel of the MOSFET, a strain in a channel of the MOSFET, on current of the MOSFET, off current of the MOSFET, an effective current of the MOSFET, or thereof. While the present invention is described in terms of a stress-model parameter, application of the present invention to a set of multiple stress-dependent model parameters is straightforward and herein explicitly contemplated.

Figure 1:
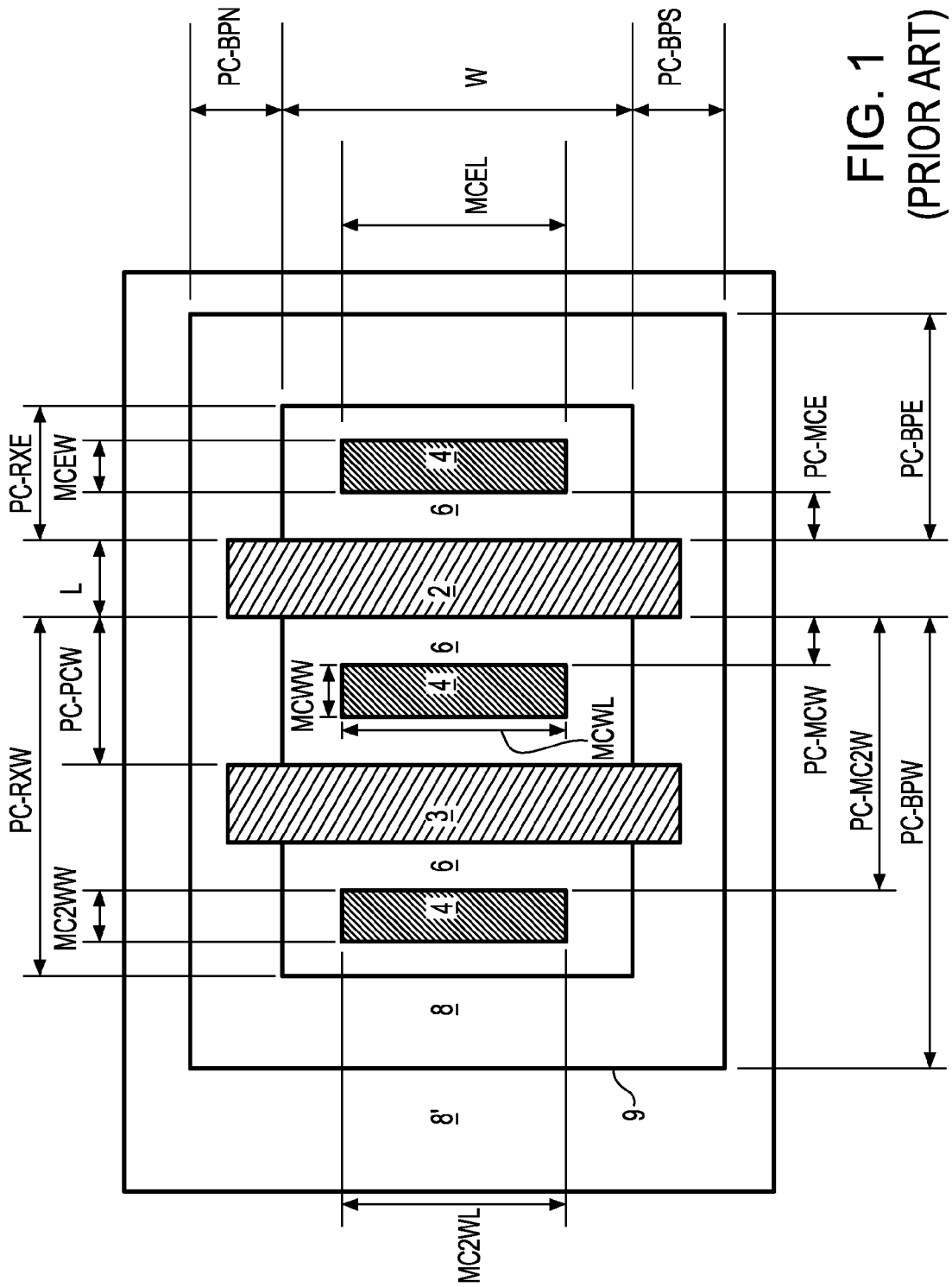
FIG. 1 is an exemplary semiconductor layout showing instances of various shape classes affecting the stress on the physical channel located beneath the physical gate structure represented by the victim gate 2.
Figure 2:
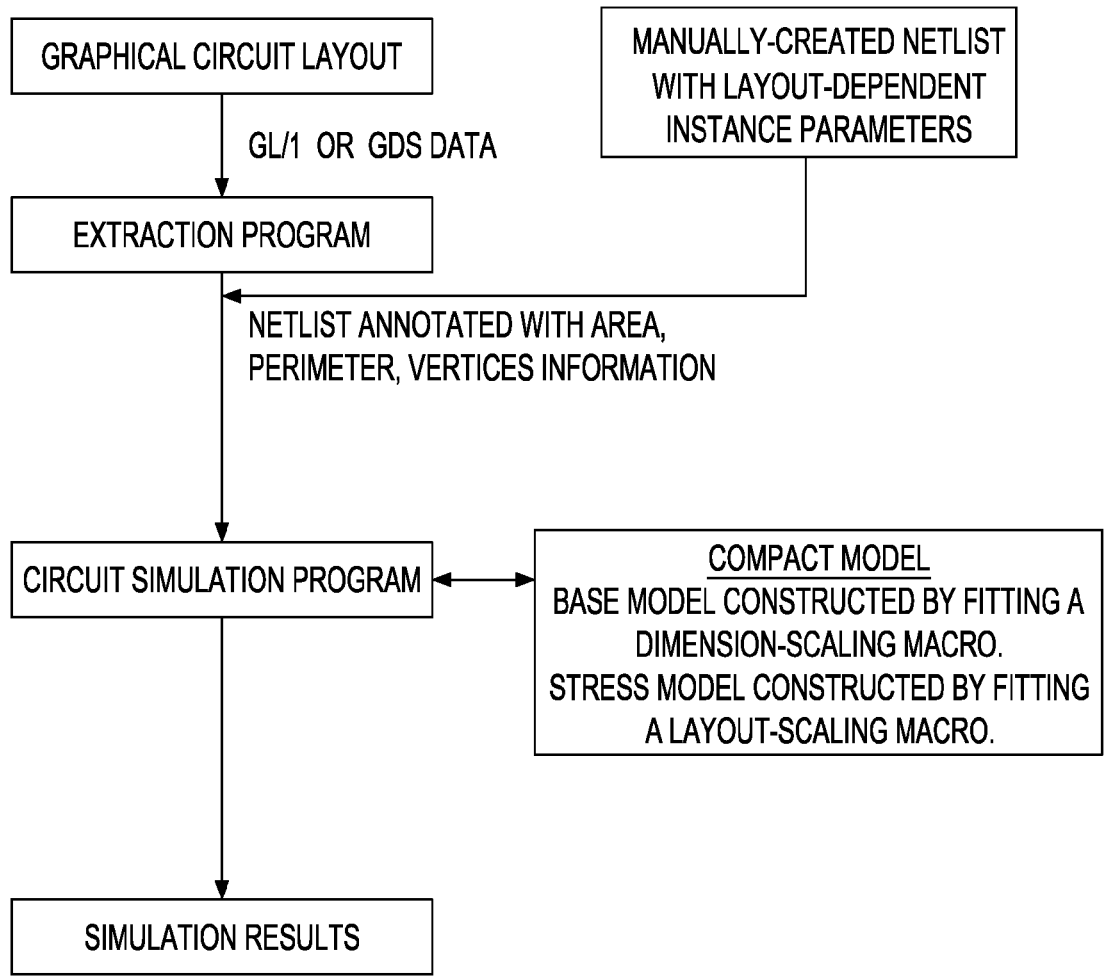
FIG. 2 shows a prior art method wherein a base model and a stress model are constructed independently.

Layout-dependent features of a semiconductor device are extracted from a layout data set by extraction means. The types and operation of extraction means are known in the art. Shape dimensions characterizing instances of at least one shape class for the semiconductor device are generated from the extracted layout-dependent features. Mathematically, each subset of the layout dependent information which is needed to calculate a stress-dependent model parameter may be considered a d-dimensional vector defined in a d-dimensional Euclidean space $R^d$, wherein d stands for the number of scalar or digital variables used in the calculation. For example, each of the shape dimensions of the instances of shape classes associated with the victim gate 2 in FIG. 1 is a scalar variable. For another example, the presence or absence of one type of stress liner is a digital variable, which may have an assigned value of 1 or 0. Since many instances of shape classes are present in a typical device layout, the number of d may be a large number. For example, if a MOSFET gate has 30 instances of shape class within an area that a stress-dependent model parameter considers for calculation of stress, the number d may exceed 120 since each instance typically introduces two scalar variables for the relative location and two scalar variables for the absolute size of the instance.

While the number d may easily become an astronomical number in complex semiconductor circuits, stress effects from instances of shape classes are typically linear. Mathematically, the superposition of stress effects by multiple instances is achieved by simple addition or subtraction. Therefore, the number of variables in modeling the stress effects on model parameters may be decreased to a manageable number. For example, if 20 stress-affecting shape classes are present in a layout data set, if four scalar parameters fully describe the features of each instance, and if each test device has a one scalar parameter that has a non-nominal value, and four non-nominal values are used to fit a scalar parameter in a test macro, the number of test devices in the test macro can be on the order of 320. The number of independent parameters is 80 in this case. In a compact model, the stress effects of multiple instances of the same shape class are calculated by adding the stress contributions from each of the multiple instances. In the test macros, therefore, the number of variables in the layout data set is minimized to a manageable number.

The layout variables of a test macro, or an ensemble of layout data set, used in generating a compact model for model parameters are grouped into two categories. The layout variables in the first category used in the generation of the compact model, or the first category layout variables, "L" comprise a set of at least one intrinsic dimension variable of the semiconductor device. Typically, first category layout variables affect the inherent stress in the semiconductor device, i.e., the self stress $\sigma_{self}$ as described above. For the purposes of description of the present invention, p denotes the number of scalar and digital layout variables in the first category layout variables, "L," i.e., L is an p-dimensional vector in an m-dimensional Euclidean space $R^p$. For example, in a MOSFET, the first category may comprise the length and/or the width of the MOSFET, in which case the number p is either 2 or 1.

The layout variables in the second category used in the generation of the compact model, or the second category layout variables, "G" comprises a set of shape parameters, or the parameters associated with the dependency of the stress on the layout of other instances of shape class other than the set of the at least one intrinsic dimension of the semiconductor device. Ideally, all stress-affecting shape dimensions that do not belong to the first category belong to the second category. The second category affects the stress on the semiconductor device through such terms as $\sigma_{CA}$, $\sigma_{PC}$, $\sigma_{RX}^L$, $\sigma_{DSL}^L$, $\sigma_{eSiGe}$, $\sigma_{RX}^T$, and $\sigma_{DSL}^L$ as described above. For the purposes of description of the present invention, n denotes the number of scalar and digital layout variables in the second category layout variables, "G," i.e., G is an q-dimensional vector in an q-dimensional Euclidean space $R^q$. In general, the true values of the stress dependent model parameter P is approximated by a function of L and G. i.e., P(L,G), which is defined in a manifold within the (p+q)-dimensional Euclidean space $R^{p+q}$. The reason some portions of the Euclidean space $R^{p+q}$ may be excluded from the domain of P(L,G) is because the values of each of the layout variable cannot be infinite in many cases and some combinations of layout variable values may be physically impossible.

Figure 3:
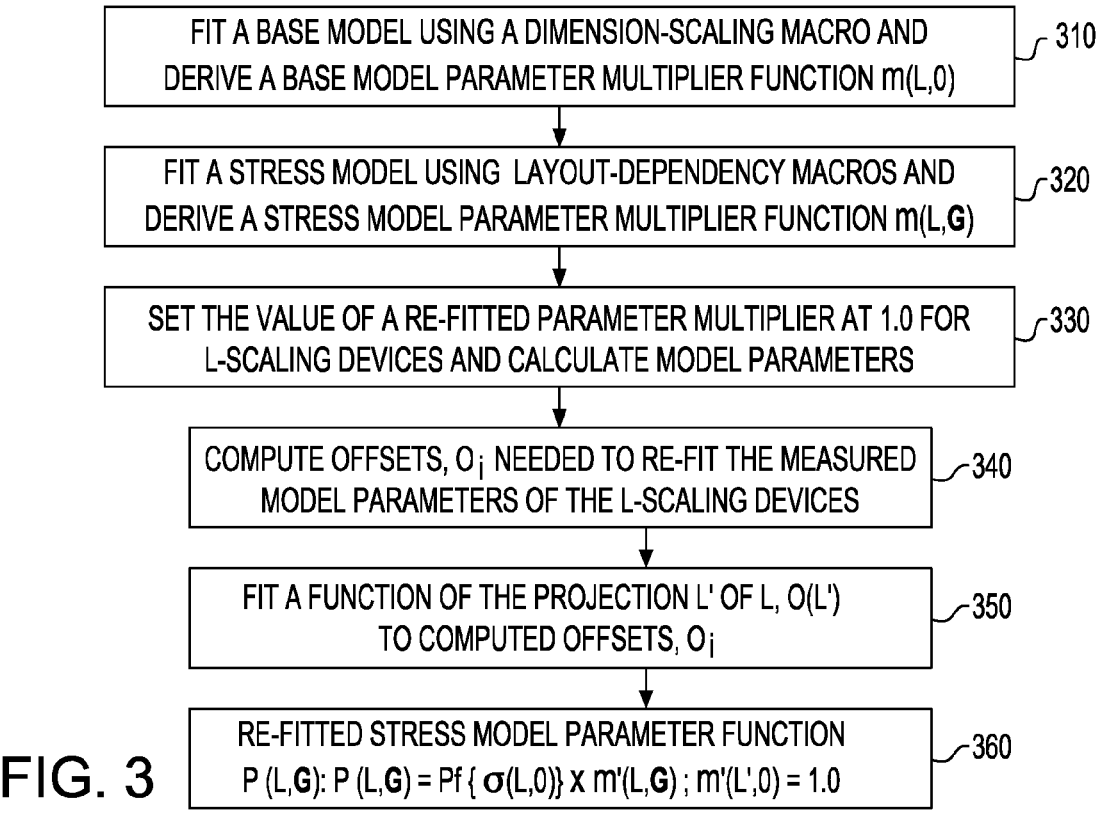
FIG. 3 shows an algorithm for computing a model parameter function according to the present invention.

According to the present invention, P(L,G) is consecutively approximated by various functions during the stages of a compact model development. Referring to FIG. 3, the block 310 represents the first stage of the compact model development. A base model develops a first functional form, or the base model parameter function Pb(L,0) by fitting a base model using only the first category layout variables, "L," while the second category variables are fixed at a reference value '0' using a first test macro, herein called a "dimension-scaling macro." Within the dimension-scaling macro, all test structures have the same or comparable values for the second category layout variables G, which is fixed at the value 0. The layout variable L is a vector in the Euclidean space $R^p$. The layout variable G and the second category layout value 0 are vectors in the Euclidean space $R^q$.

Figure 4:
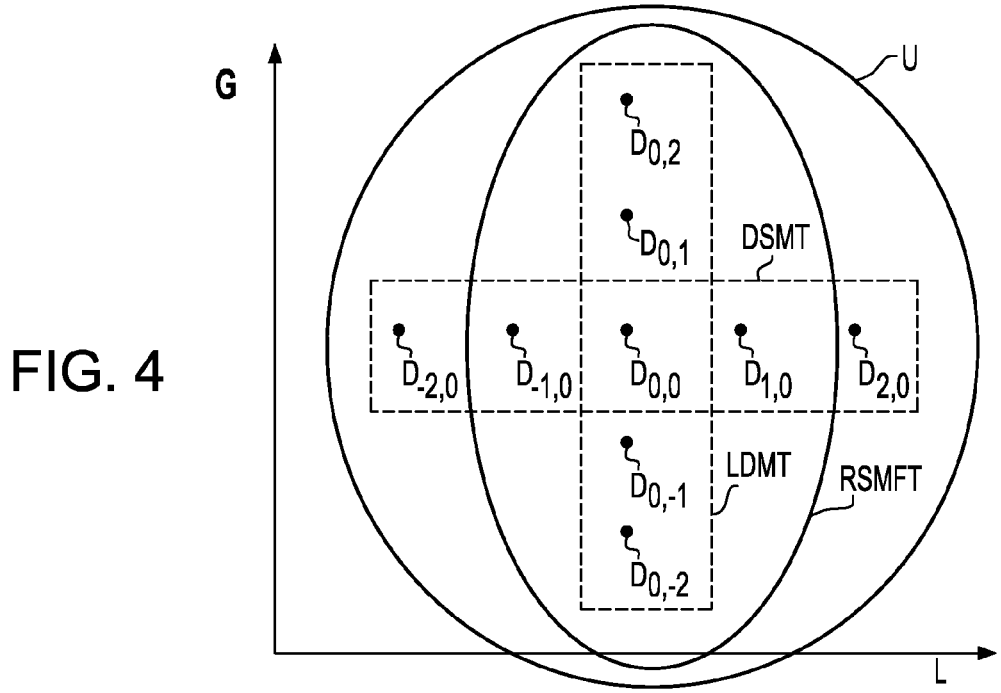
FIG. 4 shows a schematic representation of a set of test points of a dimension-scaling macro and a layout-dependency macro in the domain of the model parameter function according to the present invention.

Referring to FIG. 4, test points representing the set of combinations of L and G, that are used in the dimension-scaling macro are exemplified by the set of test points, $D_{i,0}$, with integer values of i ranging from –2 to 2. The set of the test points, $D_{i,0}$ is called a "dimension-scaling macro test points," or a DSMT. The first category layout variables L is an p-dimensional vector defined in the Euclidean space $R^p$, and the integers –2 through 2 used in FIG. 4 represent counting of the p-dimensional vectors having discrete values of the first category layout variables L. The test points in the dimension-scaling macro may be selected using a one-factor-at-a-time method, design-of-experiments (DOE) method, or other statistical methods. The representation of the DSMT by 5 points is for the purpose of illustration only since FIG. 4 is a schematic representation of (p+q)-dimensional Euclidean space $R^{p+q}$ in a 2-dimensional plane and the actual number of test points depends on the test macro design. Using the data set of measured values of the model parameter from the dimension-scaling macro, the base model calculates the base model parameter function Pb(L,0), which is given by the following equation:

$$Pb(L,0)=P_0 \times m(L,0) \qquad (D.1)$$

The base model parameter function Pb(L,0) is defined in the domain of an m-dimensional manifold, which is a subspace of the (p+q)-dimensional Euclidean space $R^{p+q}$ that represents the domain of the layout variables L and G, i.e., the value of G is fixed at 0 within the domain of the base model parameter function Pb(L,0). Here G=0 is defined by a reference stress level. $P_0$ is a constant which is typically the measured numerical value of the model parameter with a nominal value of the vector L and a nominal value of the vector G, i.e., at L=$L_0$ and at G=0. The base model parameter multiplier function m(L,0) is a dimensionless function that reflects the modifications in the values of the measured model parameter as a function of L for the given value of the variable G, which is set at 0. The value of m(L,0) is taken to be 1.0 or some other reference value at $L_0$ for a reference layout that contains a reference stress level.

Referring to FIG. 3, the block 320 represents the second stage of the compact model development. A stress model develops a second functional form, or the stress model parameter function Ps (L,G) by fitting a stress model using only the second category layout variables, "G" using a second test macro, herein called a "layout-dependency macro," while the first category variables are fixed at the reference value $L_0$. The stress model at this point is called the "original" stress model in contrast with a re-fitted stress model to be introduced subsequently. Within the layout-dependency macro, test structures can have the same values for the first category layout variables L, which is fixed at the nominal value $L_0$. The layout variable G is a vector in the Euclidean space $R^q$. The layout variable L and the nominal value $L_0$ for the second category layout variables are vectors in the Euclidean space $R^p$.

Referring to FIG. 4, test points representing the set of combinations of L and G, that are used in the layout-dependency macro, are shown by the set of test points, $D_{0,G}$, with vector values of G ranging from –2 to 2. The set of the test points, $D_{i,0}$ is called a "layout-dependency macro test points," or LDMT. The second category layout variables G is an n-dimensional vector defined in the Euclidean space $R^q$, and the vectors –2 through 2 used in FIG. 4 represent counting of the n-dimensional vectors having discrete values of the second category layout variables G. The test points in the layout-dependency macro may be selected using a one-factor-at-a-time method, design-of-experiments (DOE) method, or other statistical methods. Using the data set of measured values of the model parameter from the layout-dependency macro, the stress model calculates the stress model parameter function Ps (L,G), which is given by the following equation:

$$Ps(L,G)=P_0 \times m(L,G) \qquad (D.2)$$

The stress model parameter function Ps(L,G) is defined in the domain of an (p+q)-dimensional manifold, which is a subset in the (p+q)-dimensional Euclidean space $R^{p+q}$ that represents the layout variables L and G, i.e., the argument of the function is a combination of the layout variables L and G. $P_0$ is the same constant as in the base model parameter function Pb(L,0) which is typically the measured numerical value of the model parameter at the nominal value of the vector L, i.e., $L_0$ and at the nominal value of the vector G, i.e., 0. The stress model parameter multiplier function m(L,G) is a dimensionless function that reflects the modifications in the values of the measured model parameter as a function of L and G. The ratio of the measured values of P in the set LDMT, which are measured at $L_0$ and different values of G, to the nominal value $P_0$ is fitted to a function to generate a stress model parameter multiplier function m(L,G). The value of m(L,G) is 1.0 at ($L_0$,0) and changes as a function of L and G.

It is noteworthy that the fitting of the stress model parameter multiplier function m(L,G) is performed on the data set of the measured values of the model parameters from the layout-dependent macro and not on the data set of measured values of the model parameters from the dimension-scaling macro at this point.

According to the present invention, further functional fitting of the original stress model parameter function Ps (L,G) is performed to improve the accuracy of the compact model. This process of "re-fitting" the stress model parameter function Ps (L,G) is performed by calculating the changes in stress that are needed to "re-fit" the data set of measured values of the model parameter from the dimension-scaling macro. In other words, the medium, or the fitting parameter, of the re-fitting process is a calculated stress on the semiconductor device. Not necessarily, but preferably, a longitudinal stress component and a transverse stress component may be employed. The directions of both the longitudinal stress component and the transverse component are in the plane representing a surface of a semiconductor substrate and are orthogonal to each other.

For example, the semiconductor device to be modeled may be a MOSFET and the test macros, i.e., both the dimension-scaling macro and the layout-dependency macro, may contain model MOSFETs. The first category layout variables in this case may be a length and/or a width of the MOSFET to be modeled. Specifically, the length refers to the length of the channel of the MOSFET and the width refers to the width of the channel of the MOSFET. In the second category of layout variation, the fitting parameter may be a channel stress, or the weighted average of the vector values of the stress vector field within the channel of the MOSFET. Not necessarily, but preferably, the re-fitting process may employ a first scalar, which is a longitudinal channel stress, and a second scalar, which is a transverse channel stress, so that the effects of a three-dimensional stress vector field within the MOSFET are approximated by the first and second scalars. As described above, the model parameter may be one or a subset of the following: a carrier mobility of the MOSFET, a threshold voltage of the MOSFET, a stress in a channel of the MOSFET, a strain in a channel of the MOSFET, on current of the MOSFET, off current of the MOSFET, and an effective current of the MOSFET. Alternatively, the model parameter may be any other stress-dependent model parameter of the MOSFET.

Referring to block 330 in FIG. 3, a modified multiplier function m'(L,G) is introduced such that m'(L',0)=1.0, in which L' is a projection of L from the space of the first category layout variables into a $p_1$-dimensional subspace defined by the variations in L among the test points used in the re-fitting process. A coordinate system wherein nominal values of each of the components of L correspond to the origin is assumed so that the coordinates of the vector $L_0$ is 0 for every component of $L_0$. If any nominal component of $L_0$ is set at ∞, mathematical transformation that converts ∞ to 0 is employed, e.g., y=1/x. The number of the dimension $p_1$ is the number of degrees of freedom in the variations in the at least one intrinsic dimension variable in the first category layout variables in the data set to be used during a re-fitting process.

Within the set of test points used for the re-fitting, the at least one intrinsic dimension variable L, which is the first category layout variables, is the same as the projection L' onto the $p_1$-dimensional subspace defined by the variations in L among the test points used in the re-fitting, and consequently has a degree of freedom of $p_1$. Other components of the at least one intrinsic dimension variable, of which the degree of freedom for an arbitrary L would be $p-p_1$, are kept constant in the set of test points used for the re-fitting. In other words, the number of fixed constants in L in the data set to be used during a re-fitting process is $p_2$, wherein the sum of $p_1$ and $p_2$ equals p.

For example, if the semiconductor device is a MOSFET, the first category layout variables may comprise the length and/or the width of a MOSFET and the at least one intrinsic dimension variable may be the length of the MOSFET. The first category layout variables L in general contain variations both in the length and the width. The re-fitting process may employ the set of data from test points with varying length and a fixed width. The subspace defined by the variations in first category layout variables among the test points used in the re-fitting is the one-dimensional space defined by the length. The width is fixed at a nominal width. Within the domain of the data set used in the re-fitting, the first category layout variables L have a varying length and a fixed nominal width. The projection L' of L onto the subspace of the length variable has the varying length and a nominal width, and is consequently the same as L. The degree of freedom of the subspace defined by the projection L' is 1. The dimension of the other component that has a nominal value, i.e., the dimension of the width variable, is 1.

In general, the dimension of the projection L' may be smaller than the dimension of the first category layout variables L, or may have the same dimension as the first category layout variables L. In the case of a MOSFET, only the length may be the dimension of the subspace defined by the variations in the dataset used for re-fitting, in which case L and L' are different in general, or alternatively, both the length and the width may be the dimension of the subspace defined by the variations in the dataset used for re-fitting, in which case L and L' are the same in general.

According to the present invention, a re-fitted stress model parameter function P(L,G) is defined by utilizing the modified multiplier function m'(L,G) and a re-fitted base model parameter function Pf{σ(L,0)}. The following functional relationship is assumed:

$$P(L,G)=Pf\{\sigma(L,0)\} \times m'(L,G) \qquad (D.3)$$

In other words, the model parameter P is approximated by a re-fitted stress model parameter function P(L,G) as a function of L and G. The re-fitted stress model parameter function P(L,G) is the product of a re-fitted base model parameter function Pf{σ(L,0)} and the modified multiplier function m'(L,G). The re-fitted base model parameter function Pf{σ(L,0)} is derived from the stress model parameter function Ps(L,G) by setting the second category layout variable at 0 and refitting the data set of measured values of the model parameter from the dimension-scaling macro with a stress parameter σ(L,0), which is a function of L.

Figure 5:
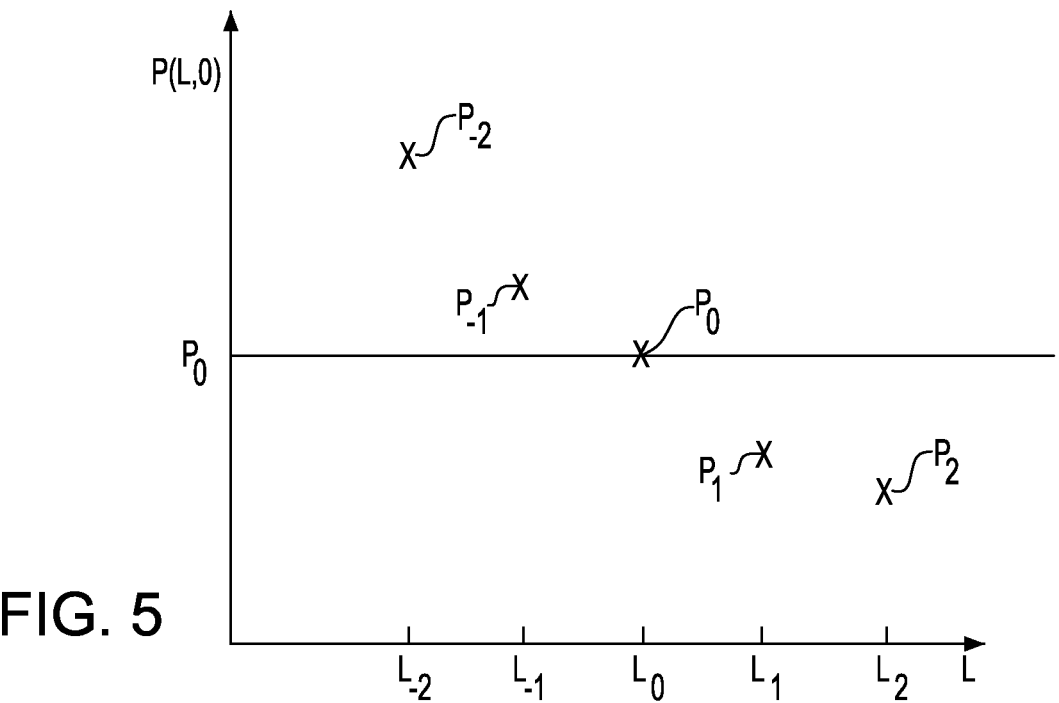
FIG. 5 shows an exemplary distribution of measured values of a model parameter P(L,0) from a dimension-scaling macro according to the present invention.

Referring to FIG. 5, the data set of measured values $P_i$ of the model parameter from the dimension-scaling macro is plotted as a function of values of the first category layout variables $L_i$ in the dimension-scaling macro. If the dimension of the variations of the projection L' is smaller than the dimension of the variations in the first category layout variables L, only a subset of test points are used for fitting of the measured values $P_i$ to the projection L' of the first category layout variables L. The subset of test points have a fixed value, typically the nominal value, for all other intrinsic dimension variables than the at least one intrinsic dimension variable that are varied within the data set. If the dimension of the variations of the projection L' is the same as the dimension of the variations in the first category layout variables L, all of the data set generated from the dimension-scaling macro may be employed for fitting the measured values $P_i$ to the projection L', which is the same as L in this case.

Referring to FIG. 4, the subset of test points that are used for fitting of the measured values $P_i$ to the projection L' of the first category layout variables L has a domain defined by the intersection set (DSMT ∩ RSMFT), wherein RSMFT (re-fitted stress model fitting test points) is the set of all test points used in the re-fitting of the stress model directly or indirectly. The set of all test points used in the fitting of the original stress model is represented by the set LDMT in FIG. 4. The set of test points used only during the re-fitting process and not during the fitting of the original stress model is given by the difference set, RSMFT−LDMT.

Referring to block 340 in FIG. 3, the stress values $\sigma_i$ needed to fit the measured values $P_i$ using the functional form P(L,G)=Pf{σ(L,0)} is calculated. The data set of measured values of the model parameter from the dimension-scaling macro with different values of the at least one intrinsic dimension variable in the first category layout variables are re-fitted by calculating the stress needed to fit the data from the dimension-scaling macro. The projections $L'_i$ of the test point values of the first category layout variables $L_i$ have different values of the at least one intrinsic dimension variable and satisfy the following relationships:

$$P(L'_i,0)=Pf\{\sigma(L'_i,0)\} \qquad (D.4)$$

The offsets, $O_i$ are calculated, which are defined by:

$$\sigma(L'_i,0)=\sigma(L_0,0) \times O_i \qquad (D.5)$$

Combination of the equations (D.4) and (D.5) yields:

$$P(L'_i,0)=Pf\{\sigma(L_0,0)\times O_i\} \quad (D.6)$$

Figure 6:
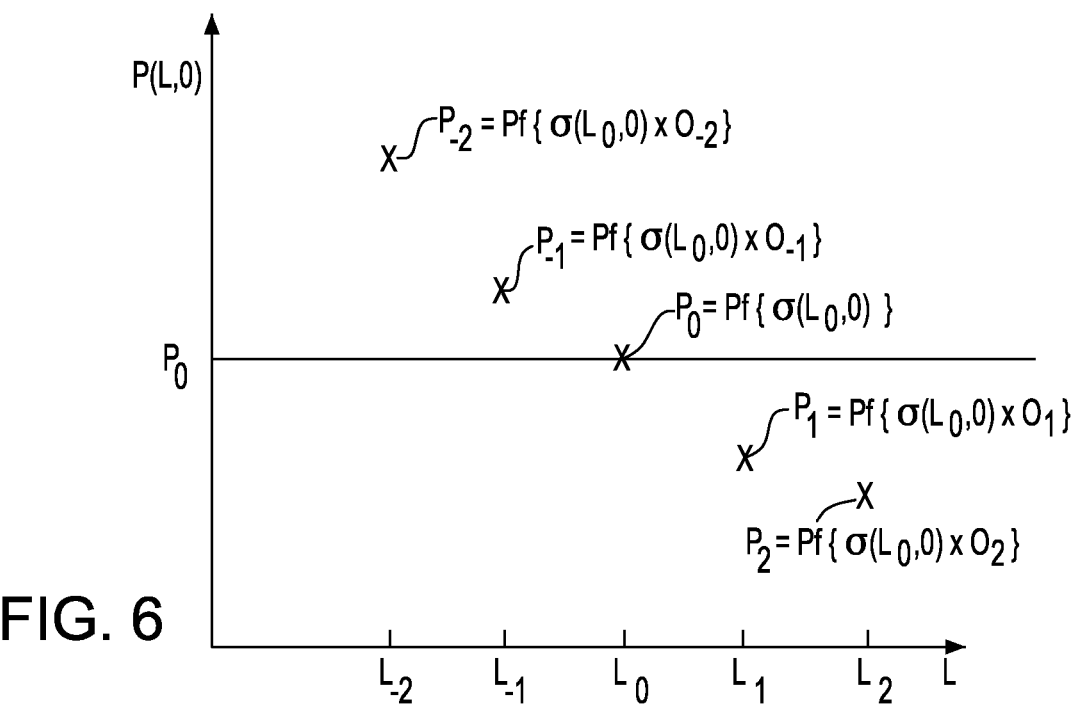
FIG. 6 shows an algorithm for calculating a re-fitted stress model parameter function Pf(L,G) and a modified multiplier function m'(L,G) according to the present invention.

Referring to FIG. 6, the re-fitting of the data set of measured values $P_i$ of the model parameter from the dimension-scaling macro with the discrete calculated offset values $O_i$ is shown. Since the stress as used by the compact model is a 3-dimensional or a two-dimensional vector, each of the offset values $O_i$ may be a set of three or two values, i.e., a vector.

Figure 7:
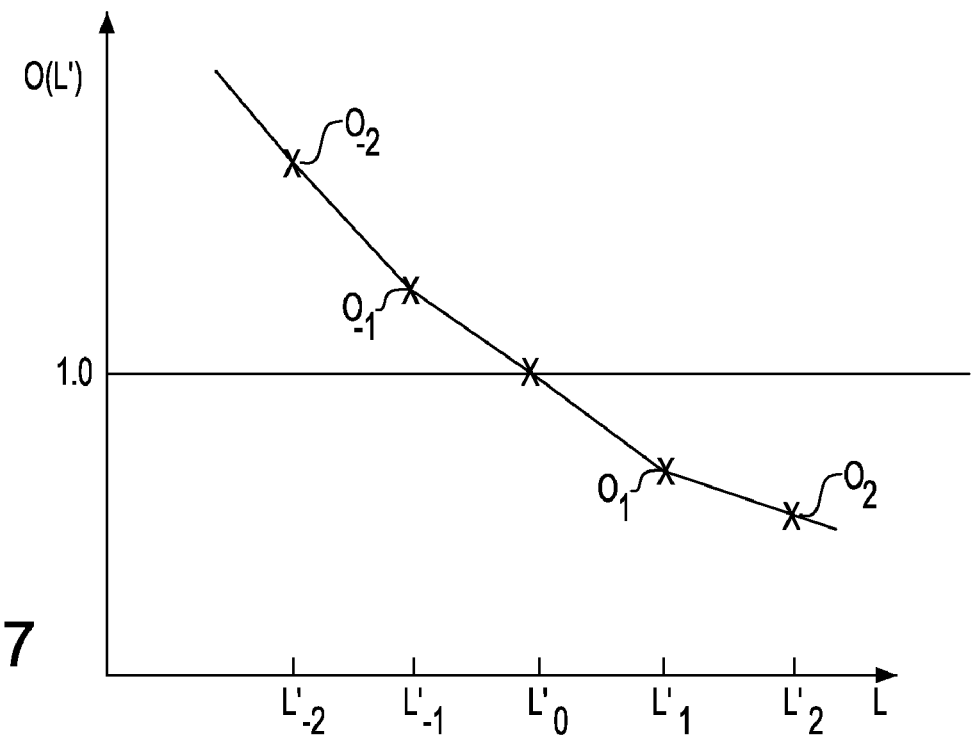
FIG. 7 shows the fitting of a dimension-dependent stress offset function to the calculated dimension dependent stress offset values.

Referring to block 350 in FIG. 3, a continuous offset vector function O(L') having the argument L' is defined by fitting the calculated offset values $O_i$ to a continuous function. This method is graphically illustrated in FIG. 7. The value of O(L') is equal to 1.0 for all components of the stress at L'=L'$_0$, i.e., at the nominal value of L', but in general it is a continuously changing vector with three or two components.

Figure 8:
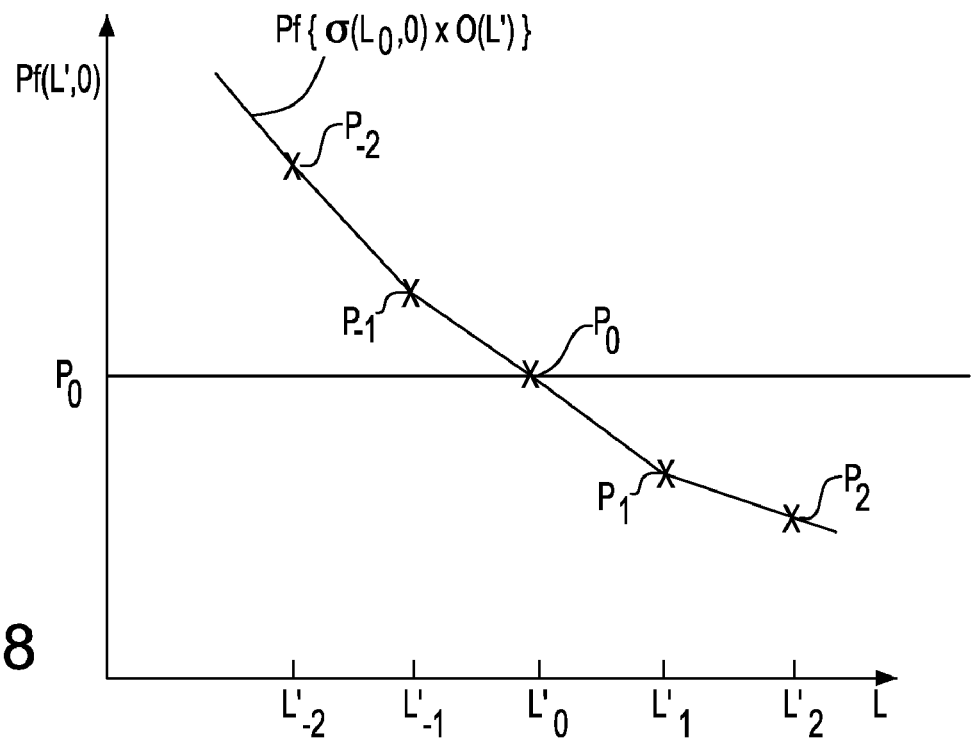
FIG. 8 shows a graph of a stress dependent formula $Pf\{\sigma(L_0,0) \times O(L)\}$ for the model parameter $P(L,0)$ in the re-fitted stress model, which fits the measured values of the model parameter $P(L,0)$ by design.

Referring to FIG. 8, the product of the nominal stress value $\sigma(L_0,0)$ and the continuous offset vector function O(L) is substituted for $\sigma(L,0)$ in equation (D.3) for the subset L', within which the at least one intrinsic dimension variable in the first category layout variables are varied, to yield $$P(L'_i,0)=Pf\{\sigma(L_0,0)\times O(L')\} \quad (D.7)$$

Referring to FIG. 3, the re-fitting process in effect uses re-fitted stress model parameter test points (RSMFT) as the test conditions for the measured values of the model parameter used for re-fitting. The re-fitted stress model parameter test points (RSMFT) is a subset of the union set U of the dimension-scaling macro test points (DSMT) and the layout-dependency macro test.

The re-fitted stress model parameter test points (RSMFT) includes at least one data point from the difference set defined by DSMT−LDMT, and includes all of LDMT. The RSMFT may be smaller than the union U set, i.e., (U−RSMFT)≠Ø, or may be the same as the union set U, i.e., (U−RSMFT)=Ø. The subspace that is defined by the at least one intrinsic dimension variable in the first category layout variables that is varied in the data set used during a re-fitting process corresponds to the subspace occupied by the test points in the set RSMFT. The dimension of degree of freedom in L within DSMT is p. The dimension of the degree of freedom in L within the intersection set (DSMT ∩ RSMFT) is $p_1$. The dimension of the degree of freedom in L within the difference set (RSMFT−DSMT) is $p_2$. The sum of $p_1$ and $p_2$ equals p. The dimension of the degree of freedom in the union set U is p+q. The dimension of the degree of freedom in the RSMFT is $p_1$+q.

For example, if the semiconductor device is a MOSFET, the first category layout variables L may comprise the length and the width of a MOSFET. The subset of values L' of the first category layout variables L may have different values of the length while the width is fixed at a constant value, i.e., at a nominal width. In this case, the re-fitted stress model parameter test points (RSMFT) comprises only the test points within the layout-dependency macro and the test points within the dimension-scaling macro that has the nominal width, i.e., $p_1$<p. If there are test points within the dimension-scaling macro with a non-nominal width, (U−RSMFT)≠Ø. In this case, the subset of values L' of the first category layout variables L has all the variations within the dimension-scaling macro, i.e., $p_1$=p, corresponding all the test points in DSMT, i.e., (U−RSMFT)=Ø.

Preferably, the re-fitted stress model may employ a longitudinal stress component and a transverse stress component, wherein the directions of both the longitudinal stress component and the transverse component are in the plane representing a surface of a semiconductor substrate and orthogonal to each other. If the semiconductor device is a MOSFET, the longitudinal stress component may be the component of the stress along the direction of a channel, i.e., along the direction of the current flow between the source and the drain. The transverse stress component may be the component of the stress perpendicular to the longitudinal stress component within the plane of the channel, i.e., the plane parallel to that defined by a gate dielectric in a planar MOSFET or in a finFET. Alternatively, the transverse component may be defined as the component of the stress along the direction perpendicular to the longitudinal stress within the plane of the surface of a semiconductor substrate.

An exemplary method of re-fitting a base model parameter function P (L',0) is herein presented, wherein the semiconductor device is a MOSFET and the projection L' of the first category layout variables is the length of the channel, $L_{poly}$. An example of the quantity corresponding to $\sigma(L_0,0)\times O(L')$ in equation (D.6) is defined as $\sigma_{Lscale}(L_{poly})$ i.e., a vector representing the channel stress as a function of $L_{poly}$ in a channel length scaling macro. Referring to equation (D.7), the base model parameter function P (L',0) is a mobility function $\mu(L_{poly})$, which is defined as a stress dependent function $\mu\{\sigma(L_{poly})\}$ The correspondence between the general methodology described above and the exemplary methodology for the MOSFET may be summarized as the following:

$$P(L',0) \rightarrow \mu(L_{poly}) \quad (D.8.a)$$

$$L' \rightarrow L_{poly} \quad (D.8.b)$$

$$\sigma(L_0,0)\times O(L') \rightarrow \sigma_{Lscale}(L_{poly})= (\sigma_{Lscale}^L(L_{poly}),\sigma L_{scale}^T(L_{poly})) \quad (D.8.c)$$

$$Pf\{\sigma(L_0,0)\} \rightarrow \mu_0 \quad (D.8.d)$$

$$Pf\{\sigma(L_0,0)\times O(L')\} \rightarrow \mu(\sigma_{Lscale}(L_{poly})) \quad (D.8.e)$$

The first category layout variables L in the exemplary methodology is $L_{poly}$ and $W_{poly}$, i.e., the length and the width of the MOSFET channel. The "$p_1$-dimensional subspace defined by the variations in L among the test points used in the re-fitting process" as defined above is the subspace defined by the variable $L_{poly}$. The number of dimension $m_1$ for the subspace is 1. The fixed variable in the first category layout variables is $W_{poly}$. The number of dimension $p_2$ for the fixed variables is 1.

While higher order coefficients of components of the at least one intrinsic dimension variable characterizing the projection L' (or inverse numbers of the components of L') may be employed in re-fitting the base model parameter function $Pf\{\sigma(L_0,0)\times O(L')\}$ in general, an example of generation of constant, linear, and quadratic coefficients of at least one intrinsic variable through the re-fitting of the data set from the dimension-scaling macro is herein demonstrated. In the exemplary methodology involving the MOSFET, constant, linear, and quadratic coefficients in $1/L_{poly}$ are employed in re-fitting the base model mobility function $\mu(\sigma_{Lscale}(L_{poly}))$. $1/L_{poly}$ is employed as an intrinsic dimension variable used in the re-fitting process. Constant, linear, and quadratic coefficients of $1/L_{poly}$ are calculated for mobility $\mu$ in this case. The measured values of mobility $\mu_i$ are fitted to a second order polynomial of the inverse of $L_{poly}$ through the following equations, wherein i stands for three discrete indices ranging from 1 to 3:

$$\mu_i = \mu_0 \times m_i; \quad (D.9.a)$$

-continued $$m_i = T_i - c_1^L(B_0 + B_1/L_{poly,i} + B_2/(L_{Lpoly,i})^2) \quad (D.9.b)$$

Where $m_i$ represents a value of a modified multiplier to the nominal value mobility, $\mu_0$ for the i-th value of $L_{poly}$, or $L_{poly,i}$. $T_i$ represents the raw, uncompensated multiplier for $L_{poly,i}$ as obtained from the base model prior to re-fitting. $c_1^L$ represents a first-order piezoresistive coefficient of the longitudinal stress for the modified multiplier, and $B_0$, $B_1$, and $B_2$ represent fitting parameters for the zeroth order, first order, and second order correction to the modified multiplier, respectively. In the exemplary methodology, the zeroth order correction is $\mu_0$ $(T_i - c_1^L B_0)$, the linear coefficient of $1/L_{poly}$ for the re-fitted mobility function is $-\mu_0 c_1^L B_1$, and the quadratic coefficient of $1/L_{poly}$ for the re-fitted mobility function is $-\mu_0 c_1^L B_2$. The values of $B_0$, $B_1$, and $B_2$ are given by:

$$B_0 = -\frac{m_2 - T_2}{c_1^L} - \frac{T_1 - T_2}{L_2 c_1^L \gamma} + B_2\left(-\frac{1}{L_2^2} + \frac{\alpha}{L_2 \gamma}\right) \quad (D.10)$$

$$B_1 = \frac{\frac{T_1 - T_2}{c_1^L} - B_2 \alpha}{\gamma}$$

$$B_2 = \frac{\frac{m_3 - T_3}{c_1^L} + C_0 + \frac{T_1 - T_2}{c_1^L \gamma L_3}}{-C_1 + \frac{\alpha}{\gamma L_3} - \frac{1}{L_3^2}},$$

wherein $$\alpha = \frac{1}{L_1^2} - \frac{1}{L_2^2}$$

$$\gamma = \frac{1}{L_1} - \frac{1}{L_2}$$

$$B_0 = C_0 + B_2 C_1$$

Referring to block 360 in FIG. 3, the function form for Pf{σ(L,0)} in equation (D.3) is approximated by Pf (L',0) given by equation (D.7). The re-fitted stress model parameter function P(L,G) now has a definite form given by:

$$P(L,G) = Pf\{\sigma(L_0,0) \times O(L')\} \times m'(L,G), \quad (D.11)$$

which may alternately be written as $$P(L,G) = Pf\{\sigma(L,0)\} \times m'(L,G), \quad (D.12)$$

or as an expression for the modified multiplier function m'(L,G), which has the form of $$m'(L,G) = P(L,G)/Pf\{\sigma(L,0)\} \quad (D.13)$$

L is a set of at least one intrinsic dimension of the semiconductor device, G is a set of shape parameters, P(L,G) is a dimension and geometry dependent formula for a model parameter P, σ(L,0) is a dimension dependent formula for stress on the first model semiconductor devices, and Pf{σ(L,0)} is a stress dependent formula for the model parameter in the re-fitted stress model. The modified multiplier function, m'(L,G) is 1.0 for all values of the at least one intrinsic dimension that is used in the re-fitting, i.e., when L' is the same as the projection of L. In the exemplary methodology, the re-fitting intrinsic dimension variable may be $L_{poly}$ or $1/L_{poly}$, and the modified multiplier is defined as 1.0 for all value of $L_{poly}$ when the values of other layout variables are nominal, i.e., when $W_{poly}$ has a nominal value and the set of shape parameters G has a nominal value, e.g., as in the dimension-scaling macro.

Figure 9:
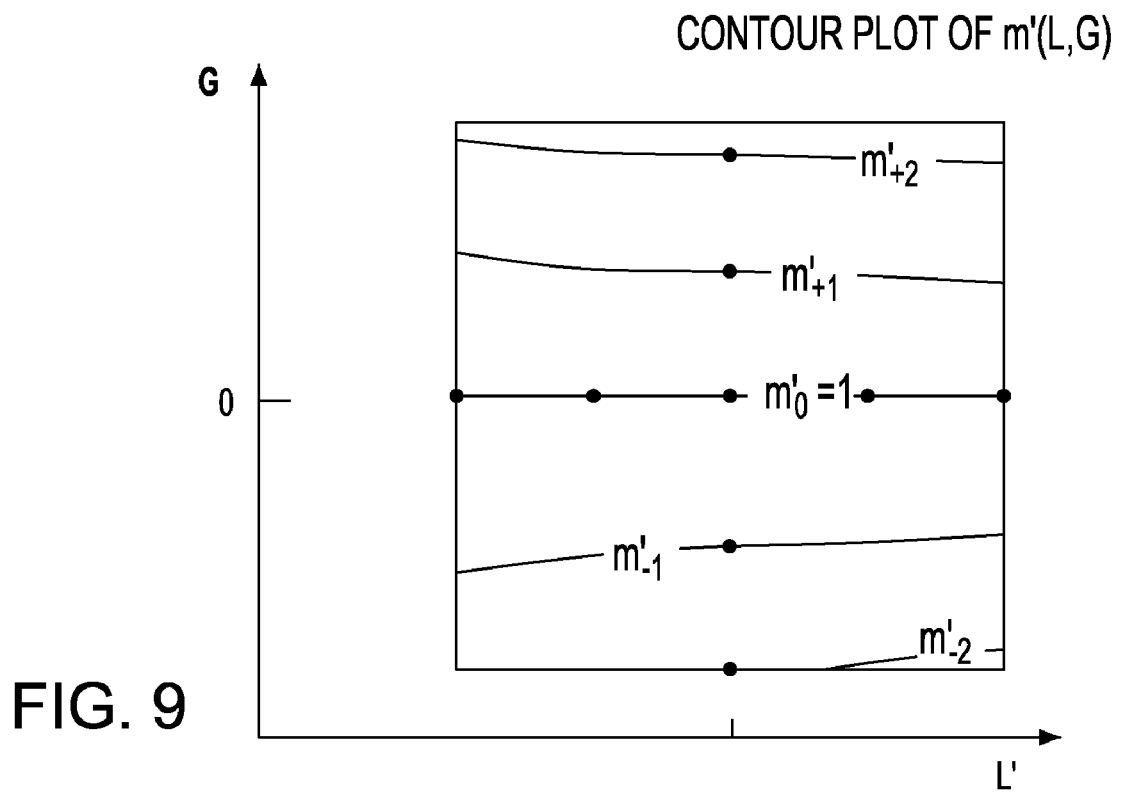
FIG. 9 show a schematic representation of a contour plot of modified multiplier function, $m'(L,G)$ which has a mathematical form of $m'(L,G)=P(L,G)/Pf\{\sigma(L,0)\}$, as plotted in an $(p_1+q)$-dimensional space where in $p_1$ is the degree of freedom of re-fitting parameters for a data set from a dimension-scaling macro and n is the degree of freedom of the test points for a layout-dependency macro.

Referring to FIG. 9, an exemplary schematic contour plot of the modified multiplier function, m'(L,G) is shown. The horizontal axis represents a subspace defined by the projection L' of the first category layout variables L onto the subspace of the at least one intrinsic dimension variable that is used in the re-fitting process, for example, $1/L_{poly}$ in the exemplary methodology for a MOSFET. The value of m'(L, G) may be different from 1.0 for a non-nominal value of G, which is the second category layout variables described above. Also, if the projection L' is different from L, i.e., if any other intrinsic dimension variable than the at least one intrinsic dimension variable used as a re-fitting parameter has a non-nominal value, the value of m'(L,G) may be different from 1.0. If the projection L' is the same as the first category layout variables L, m'(L,G) is equal to 1.0.

Figure 10:
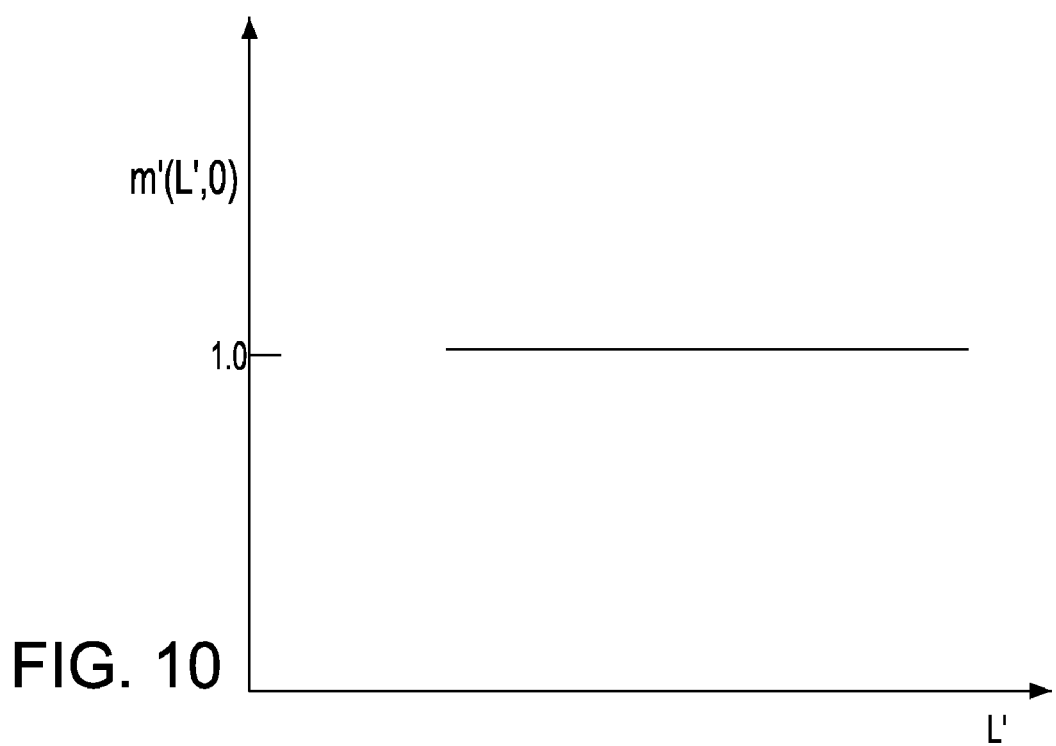
FIG. 10 shows a plot of the modified multiplier function, $m'(L',0)$ as a function of the projection $L'$ of the at least one intrinsic dimension variable L used in re-fitting an original stress model parameter function while other intrinsic dimension variables set at nominal values.

Referring to FIG. 10 a plot of the modified multiplier function, m'(L',0) in the subspace defined by the projection L' of the first category layout variables L as a function of the projection L' is shown. The at least one intrinsic dimension variable that is varied during the re-fitting process is varied along the horizontal axis while other intrinsic dimension variables are set at their nominal values. Within the limited domain of L', defined by the varied parameters of the first category layout variables among the test points used in the re-fitting process, i.e., the intersection set (DSMT ∩ RSMFT) in FIG. 4, the modified multiplier function, m'(L,0) is normalized to 1.0.

The methods of re-fitting the stress model to the dataset from the dimension-scaling macro may be employed to improve the performance of systems designed to model a semiconductor device, to simulate semiconductor circuit operation, and/or to optimize design of semiconductor circuit. Within these systems, the semiconductor device has at least one stress-generating component or at least one stress-transmitting component, i.e., the performance of the semiconductor device is affected by stress.

This is achieved by providing fitting means for each stage of fitting a data set during the implementation of the methods described above. Specifically, a first fitting means is employed for fitting a first data set from a dimension-scaling macro to a base model, in which at least one intrinsic dimension of first model semiconductor devices is varied, as shown in block 310 in FIG. 3. A second fitting means is employed for fitting a second data set from a layout-dependency macro to an original stress model, wherein instances of at least one shape class with various shape dimensions are present around the second model semiconductor devices in the layout-dependency macro, as shown in block 320 in FIG. 3. A third fitting means is employed for re-fitting the at least one model parameter to the first data set to generate a re-fitted stress model, as described in paragraphs accompanying blocks 330-360 in FIG. 3. Both the base model and the original stress mode have a capability to calculate at least one stress-dependent model parameter. At least one model parameter formula for the at least one model parameter is generated from the base model and the original stress model, and is subsequently modified during the re-fitting to provide a re-fitted stress model with improved accuracy in the calculation of the at least one stress-dependent model parameter.

Each of the first, second, and the third fitting means may be an automated computer program. A calculating means for calculating at least one stress offset during the fitting of the at least one model parameter to the first data set may also be employed.

For a system for simulating semiconductor circuit operation, an extraction means and a compact model are provided. The extraction means extracts layout-dependent information of a semiconductor circuit from a layout data set. The extraction means may be an automated computer program. The compact model receives the layout-dependent information and generates at least one stress-dependent model parameter value for a semiconductor device in the semiconductor circuit for use in modeling the performance of the semiconductor circuit. The at least one stress-dependent model parameter value is generated from a re-fitted stress model which is generated by re-fitting an original stress model to a first data set from a dimension-scaling macro as described above. The re-fitted stress model is dependent on a dimension-dependent stress offset function, and the dimension-dependent stress offset function is generated by fitting stress to measured values of model parameters from a first data set from a dimension-scaling macro.

The system may further comprise calculating means for a modified multiplier function, m'(L,G) described above.

For a system for optimizing design of semiconductor circuit, the system may further comprises a circuit performance evaluation means for determining if a performance goal for the semiconductor circuit is met and, if a performance goal is not met, generating a diagnosis of causes of not meeting the performance goal.

The layout data set may be modified for further simulation if the performance goal is not met, and another round of simulation is performed until either the performance goal for the semiconductor circuit is achieved or results of simulation satisfies a preset condition for stopping a simulation.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A method for modeling a semiconductor device, wherein stress is applied to the semiconductor device, the method comprising:

generating, and storing in a system configured to store data, a dimension-scaling macro and a layout-dependency macro, wherein at least one intrinsic dimension of first model semiconductor devices is varied within said dimension-scaling macro, instances of at least one shape class with various shape dimensions are present around second model semiconductor devices in said layout-dependency macro, and each of said dimension-scaling macro and said layout-dependency macro are embodied as data in said system upon said storing;

deriving a base model by fitting a first data set from said dimension-scaling macro and by employing a first fitting means embodied in said system;

deriving an original stress model by fitting a second data set from said layout-dependency macro and by employing a second fitting means embodied in said system;

re-fitting said original stress model to said first data set to calculate a dimension-dependent stress offset function;

incorporating said dimension-dependent stress offset function into a re-fitted stress model wherein the refitted stress model employs a modified multiplier function, m'(L,G), having a mathematical form of m'(L,G)=P(L,G)/Pf{σ(L,0)}, wherein L is a set of at least one intrinsic dimension of said semiconductor device, G is a set of shape parameters, P(L,G) is a dimension and geometry dependent formula for a model parameter, σ(L,0) is a dimension dependent formula for stress on said first model semiconductor devices, and Pf{σ(L,0)} is a stress dependent formula for said model parameter in said re-fitted stress model evaluated at G=0; and generating by employing said system, and outputting from said system in a tangible medium, a simulation result for said model parameter of a semiconductor device, wherein said simulation result is given by said dimension and geometry dependent formula P(L,G).

2. The method of claim 1, wherein a value of said modified multiplier function, m'(L,G) is 1.0 for all values of said at least one intrinsic dimension that is used in said re-fitting.

3. The method of claim 1, wherein said re-fitted stress model employs a longitudinal stress component and a transverse stress component, wherein directions of both said longitudinal stress component and said transverse component are in a plane representing a surface of a semiconductor substrate and are orthogonal to each other.

4. The method of claim 3, further comprising calculating constant, linear, and quadratic coefficients of at least one intrinsic variable for said model parameter through said re-fitting of said original stress model to said first data set.

5. The method of claim 1, further comprising:
extracting layout-dependent features of said semiconductor device from a layout data set; and
generating shape dimensions characterizing instances of at least one shape class from said layout-dependent features.

6. The method of claim 1, wherein said semiconductor device, said first model semiconductor devices, and said second model semiconductor devices are a metal-oxide-semiconductor field effect transistor (MOSFET), first model MOSFETS, and second model MOSFETs, respectively.

7. The method of claim 6, wherein said re-fitted stress model employs a first scalar, which is a longitudinal channel stress, and a second scalar, which is a transverse channel stress, wherein an effect of a three-dimensional stress field within said MOSFET is approximated by said first and second scalars.

8. The method of claim 6, wherein said model parameter comprises at least one physical quantity selected from the group consisting of a carrier mobility of said MOSFET, a threshold voltage of said MOSFET, a stress in a channel of said MOSFET, a strain in a channel of said MOSFET, on current of said MOSFET, off current of said MOSFET, and an effective current of said MOSFET.

9. The method of claim 8, wherein said model parameter is a carrier mobility of said MOSFET.

10. The method of claim 6, wherein said at least one intrinsic dimension of said first model MOSFETs comprise in a mathematical sense a length and a width of said first model semiconductor devices.

11. The method of claim 10, wherein said re-fitting of said original stress model to said first data set is performed on said first model MOSFETs amongst which the lengths are varied.

12. A system for modeling a semiconductor device, said semiconductor device having at least one stress-generating component or at least one stress-transmitting component, the system comprising:

a first fitting means for fitting a first data set from a dimension-scaling macro to a base model, wherein at least one intrinsic dimension of first model semiconductor devices is varied within said dimension-scaling macro and said base model has a capability to calculate at least one model parameter;

a second fitting means for fitting a second data set from a layout-dependency macro to an original stress model, wherein instances of at least one shape class with various shape dimensions are present around second model semiconductor devices in the layout-dependency macro and said original stress model has a capability to calculate said at least one model parameter;

a third fitting means for re-fitting said at least one model parameter to said first data set to generate a re-fitted stress model; and calculating means for a modified multiplier function, m'(L, G), which has a mathematical form of m'(L,G)=P(L,G)/Pf{σ(L,0)}, wherein L is a set of at least one intrinsic dimension of said semiconductor device, G is a set of shape parameters, P(L,G) is a dimension and geometry dependent formula for a model parameter, σ(L,0) is a dimension dependent formula for stress on said first model semiconductor devices, and Pf{σ(L,0)} is a stress dependent formula for said model parameter in said re-fitted stress model.

13. The system of claim 12, further comprising a calculating means for calculating at least one stress offset during said re-fitting of said at least one model parameter to said first data set.

14. The system of claim 12, wherein said re-fitted stress model employs a first scalar, which is a longitudinal channel stress, and a second scalar, which is a transverse channel stress, wherein an effect of a three-dimensional stress field within a MOSFET is approximated by said first and second scalars.

15. The system of claim 12, wherein constant, linear, and quadratic coefficients of at least one intrinsic variable for said at least one model parameter are calculated through said re-fitting of said at least one model parameter to said first data set.

16. The system of claim 12, wherein said semiconductor device, said first model semiconductor devices, and said second model semiconductor devices are a metal-oxide-semiconductor field effect transistor (MOSFET), first model MOSFETs, and second model MOSFETs, respectively.

17. The system of claim 16, wherein said at least one model parameter comprises at least one physical quantity selected from the group consisting of a carrier mobility of said MOSFET, a threshold voltage of said MOSFET, a stress in a channel of said MOSFET, a strain in a channel of said MOSFET, on current of said MOSFET, off current of said MOSFET, and an effective current of said MOSFET.

18. A system for simulating semiconductor circuit operation, comprising:

extraction means for extracting layout-dependent information of a semiconductor circuit from a layout data set;

a compact model which receives said layout-dependent information and generates at least one stress-dependent model parameter for a semiconductor device in said semiconductor circuit for use in modeling the performance of said semiconductor circuit, wherein said at least one stress-dependent model parameter is generated from a re-fitted stress model which is generated by re-fitting an original stress model to a first data set from a dimension-scaling macro, said re-fitted stress model is dependent on a dimension-dependent stress offset function, and said dimension-dependent stress offset function is generated by re-fitting stress to measured values of model parameters from a first data set from said dimension-scaling macro; and calculating means for a modified multiplier function, m'(L, G), which has a mathematical form of m'(L,G)=P(L,G)/Pf{σ(L,0)}, wherein L is a set of at least one intrinsic dimension of said semiconductor device, G is a set of shape parameters, P(L,G) is a dimension and geometry dependent formula for a model parameter, σ(L,0) is a dimension dependent formula for stress on first model semiconductor devices, and Pf{σ(L,0)} is a stress dependent formula for said model parameter in said re-fitted stress model.

19. The system of claim 18, wherein said semiconductor device is a MOSFET and said re-fitted stress model employs a first scalar, which is a longitudinal channel stress, and a second scalar, which is a transverse channel stress, wherein an effect of a three-dimensional stress field within said MOSFET is approximated by said first and second scalars.

20. The system of claim 18, wherein said semiconductor device is a MOSFET and said at least one stress-dependent model parameter comprises at least one physical quantity selected from the group consisting of a carrier mobility of said MOSFET, a threshold voltage of said MOSFET, a stress in a channel of said MOSFET, a strain in a channel of said MOSFET, on current of said MOSFET, off current of said MOSFET, and an effective current of said MOSFET.

21. The system of claim 18, wherein said re-fitted stress model employs a longitudinal stress component and a transverse stress component, wherein directions of both said longitudinal stress component and said transverse component are in a plane representing a surface of a semiconductor substrate and are orthogonal to each other.

22. The system of claim 21, wherein constant, linear, and quadratic coefficients of at least one intrinsic variable for said model parameter are calculated through said re-fitting of said original stress model to said first data set.

23. A system for optimizing design of semiconductor circuit, said system comprising:

extraction means for extracting layout-dependent information of a semiconductor circuit from a layout data set;

a compact model which receives said layout-dependent information and simulates said semiconductor circuit, wherein a re-fitted stress model generates at least one stress-dependent model parameter, said re-fitted stress model being generated by re-fitting an original stress model to a first data set from a dimension-scaling macro and being dependent on a dimension-dependent stress offset function, and said dimension-dependent stress offset function being generated by re-fitting stress to measured values of model parameters from a first data set from said dimension-scaling macro;

calculating means for a modified multiplier function, m'(L, G), which has a mathematical form of m'(L,G)=P(L,G)/Pf{σ(L,0)}, wherein L is a set of at least one intrinsic dimension of said semiconductor device, G is a set of shape parameters, P(L,G) is a dimension and geometry dependent formula for a model parameter, σ(L,0) is a dimension dependent formula for stress on first model semiconductor devices, and Pf{σ(L,0)} is a stress dependent formula for said model parameter in said re-fitted stress model; and a circuit performance evaluation means for determining if a performance goal for said semiconductor circuit is met and, if a performance goal is not met, generating a diagnosis of causes of not meeting said performance goal.

24. The system of claim 23, wherein said layout data set is modified for further simulation if said performance goal is not met, and another round of simulation is performed until either said performance goal for said semiconductor circuit is achieved or results of simulation satisfies a preset condition for stopping a simulation.

25. The system of claim 23, wherein said re-fitted stress model employs a longitudinal stress component and a transverse stress component and said re-fitted stress model provides constant, linear, and quadratic coefficients of at least one intrinsic variable for said model parameter through said re-fitting of said original stress model to said first data set.

26. The system of claim 25, wherein said re-fitted stress model provides calculated constant, linear, and quadratic stress term coefficients of said longitudinal stress component and said transverse stress component for said at least one stress-dependent model parameter.

27. The system of claim 23, wherein said semiconductor circuit comprises a MOSFET and said at least one stress-dependent model parameter represents at least one physical quantity selected from the group consisting of a carrier mobility of said MOSFET, a threshold voltage of said MOSFET, a stress in a channel of said MOSFET, a strain in a channel of said MOSFET, on current of said MOSFET, off current of said MOSFET, and an effective current of said MOSFET.

28. The system of claim 23, wherein said semiconductor circuit comprises a MOSFET and said re-fitted stress model employs a first scalar, which is a longitudinal channel stress, and a second scalar, which is a transverse channel stress, wherein an effect of a three-dimensional stress field within said MOSFET is approximated by said first and second scalars.

* * * * *